(12) United States Patent
You et al.

(10) Patent No.: US 11,995,111 B2
(45) Date of Patent: May 28, 2024

(54) EFFICIENT AND COMPACT TEXT MATCHING SYSTEM FOR SENTENCE PAIRS

(71) Applicant: TENCENT AMERICA LLC, Palo Alto, CA (US)

(72) Inventors: Zeyu You, San Jose, CA (US); Tao Yang, Mountain View, CA (US); Shangqing Zhang, San Jose, CA (US); Min Tu, Cupertino, CA (US); Xu Wang, Palo Alto, CA (US); Lianyi Han, Palo Alto, CA (US); Wei Fan, New York, NY (US)

(73) Assignee: TENCENT AMERICA LLC, Palo Alto, CA (US)

( * ) Notice: Subject to any disclaimer, the term of this patent is extended or adjusted under 35 U.S.C. 154(b) by 247 days.

(21) Appl. No.: 17/097,589

(22) Filed: Nov. 13, 2020

(65) Prior Publication Data

US 2022/0156297 A1    May 19, 2022

(51) Int. Cl.
*G06F 16/33*     (2019.01)
*G06F 16/332*    (2019.01)
*G06N 3/08*      (2023.01)

(52) U.S. Cl.
CPC ...... *G06F 16/3329* (2019.01); *G06F 16/3334* (2019.01); *G06F 16/3346* (2019.01); *G06N 3/08* (2013.01)

(58) Field of Classification Search
CPC ........ G06F 40/30; G06F 16/30; G06F 16/338; G06F 16/335; G06F 16/35; G06F 16/383; G06F 16/54; G06F 16/55; G06F 16/56; G06F 16/63; G06F 16/74; G06F 16/75
USPC ...... 707/17.039, 739, 17.098, 17.051, 17.08, 707/17.079, 728, 796, 748, 17.071
See application file for complete search history.

(56) References Cited

U.S. PATENT DOCUMENTS

| | | | |
|---|---|---|---|
| 6,810,376 B1 | 10/2004 | Guan et al. | |
| 10,754,851 B2 * | 8/2020 | Cohen | G06N 3/042 |
| 10,776,581 B2 * | 9/2020 | McCann | G06N 3/045 |
| 10,839,223 B1 * | 11/2020 | Jiang | G06V 20/46 |
| 10,929,614 B2 * | 2/2021 | Mei | G06F 40/30 |
| 11,210,523 B2 * | 12/2021 | Geng | G06V 10/764 |
| 11,271,876 B2 * | 3/2022 | Yoon | G06F 16/903 |
| 11,531,834 B2 * | 12/2022 | Paukkeri | G06F 18/214 |
| 11,580,309 B1 * | 2/2023 | Mason | G06F 40/284 |

(Continued)

OTHER PUBLICATIONS

Runqi Yang et al., "Simple and Effective Text Matching with Richer Alignment Features", Proceedings of the 57th Annual Meeting of the Association for Computational Linguistics, Jul. 28-Aug. 2, 2019, pp. 4699-4709 (11 pages total).

(Continued)

*Primary Examiner* — Tony Mahmoudi
*Assistant Examiner* — Linh Black
(74) *Attorney, Agent, or Firm* — Sughrue Mion, PLLC

(57) ABSTRACT

A method, computer program, and computer system is provided for query matching of sentences based on co-attention scores. Two or more query inputs to a neural network are received. A correlation factor between the two or more query input is identified based on attention weights. A feature vector is generated based on the attention weights. A probability value corresponding to the two or more query inputs is determined based on the generated feature vector.

11 Claims, 6 Drawing Sheets

(56) References Cited

U.S. PATENT DOCUMENTS

| | | |
|---|---|---|
| 2008/0301135 A1 | 12/2008 | Alves et al. |
| 2018/0129938 A1* | 5/2018 | Xiong .................... G06N 5/022 |
| 2018/0196881 A1* | 7/2018 | Lundin ................ G06F 40/205 |
| 2019/0041843 A1* | 2/2019 | Cella ................. G05B 19/4184 |
| 2019/0122651 A1* | 4/2019 | Arik ........................ G10L 13/08 |
| 2019/0251168 A1* | 8/2019 | McCann ................... G06N 3/04 |
| 2019/0355270 A1* | 11/2019 | McCann ................ G06F 40/30 |
| 2020/0193245 A1* | 6/2020 | Divakaran ............... G06N 3/08 |
| 2020/0253527 A1* | 8/2020 | Ellison ................... A61B 5/165 |
| 2020/0285951 A1* | 9/2020 | Kim ........................ G06N 3/08 |
| 2021/0012199 A1* | 1/2021 | Zhang ...................... G06N 7/01 |
| 2021/0064665 A1* | 3/2021 | Zhao .................... G06F 16/951 |
| 2021/0144442 A1* | 5/2021 | Liu ........................ G06V 20/49 |
| 2021/0201044 A1* | 7/2021 | Herdade ................. G06T 11/20 |
| 2021/0216862 A1* | 7/2021 | Liu ...................... G06V 10/764 |
| 2021/0248375 A1* | 8/2021 | Geng ................. G06F 18/2113 |
| 2021/0248376 A1* | 8/2021 | Zhao ................ G06V 30/19173 |
| 2021/0279235 A1* | 9/2021 | He ......................... G06F 16/243 |

OTHER PUBLICATIONS

Lili Mou et al. "Natural Language Inference by Tree-Based Convolution and Heuristic Matching", ACL'16, arXiv preprint arXiv:1512.08422v3, May 13, 2016, ( 7 pages total).

Written Opinion of the International Searching Authority dated Sep. 29, 2021, in International Application No. PCT/US2021/039033.

International Search Report dated Sep. 29, 2021, in International Application No. PCT/US2021/039033.

Galassi et al. "Attention in Natural Language Processing", IEEE Transactions on Neural Networks and Learning Systems, vol. 32, Issue 10, Sep. 10, 2020, pp. 1-18 (20 pages).

Ratsaby, "On learning Multicategory classification with sample Queries", Information and Computation, vol. 185, Issue2, Sep. 15, 2003, pp. 1-39 (41 pages total).

* cited by examiner

EFFICIENT AND COMPACT TEXT MATCHING SYSTEM FOR SENTENCE PAIRS

BACKGROUND

This disclosure relates generally to field of data processing, and more particularly to query matching.

Natural language sentence pair matching task aims to produce a label that describes whether the two sentences are semantically matched or not. This task is one of the core research problem in the natural language processing (NLP) field. The sentence pair matching problem arises in many applications such as ranking the pair of the retrieved question and the user query in the chatbot system, localizing the answer of the user query in the long paragraph, and etc.

In text matching tasks, the goal is to learn a scoring system that produces a matching score of given the pair of text. This matching task is one of the most important tasks in the natural language processing (NLP) field, which can be applied to various application domains. For an example, in the question answer (QA) system, whether the retrieved question or answer is matched with the user query is an important factor of the system that would affect the user satisfactory performance. The methods for text matching falls in the following two categories. In a rule-based system, the sentence pair are cut into words and the matching score is provided based on the average of the matching scores between a word in one sentence and the most similar word in another sentence. The rule-based methods are fast at producing the matching score in the inference stage and do not require training. In a deep-learning-based system, the deep learning models such as LSTM, BERT, or DSSM, Match Pyramid are currently state-of-the-art models for the sentence pair matching task.

SUMMARY

Embodiments relate to a method, system, and computer readable medium for query matching. According to one aspect, a method for query matching is provided. The method may include receiving two or more query inputs to a neural network. A correlation factor between the two or more query input is identified based on attention weights. A feature vector is generated based on the attention weights. A probability value corresponding to the two or more query inputs is determined based on the generated feature vector.

According to another aspect, a computer system for query matching is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving two or more query inputs to a neural network. A correlation factor between the two or more query input is identified based on attention weights. A feature vector is generated based on the attention weights. A probability value corresponding to the two or more query inputs is determined based on the generated feature vector.

According to yet another aspect, a computer readable medium for query matching is provided. The computer readable medium may include one or more computer-readable storage devices and program instructions stored on at least one of the one or more tangible storage devices, the program instructions executable by a processor. The program instructions are executable by a processor for performing a method that may accordingly include receiving two or more query inputs to a neural network. A correlation factor between the two or more query input is identified based on attention weights. A feature vector is generated based on the attention weights. A probability value corresponding to the two or more query inputs is determined based on the generated feature vector.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
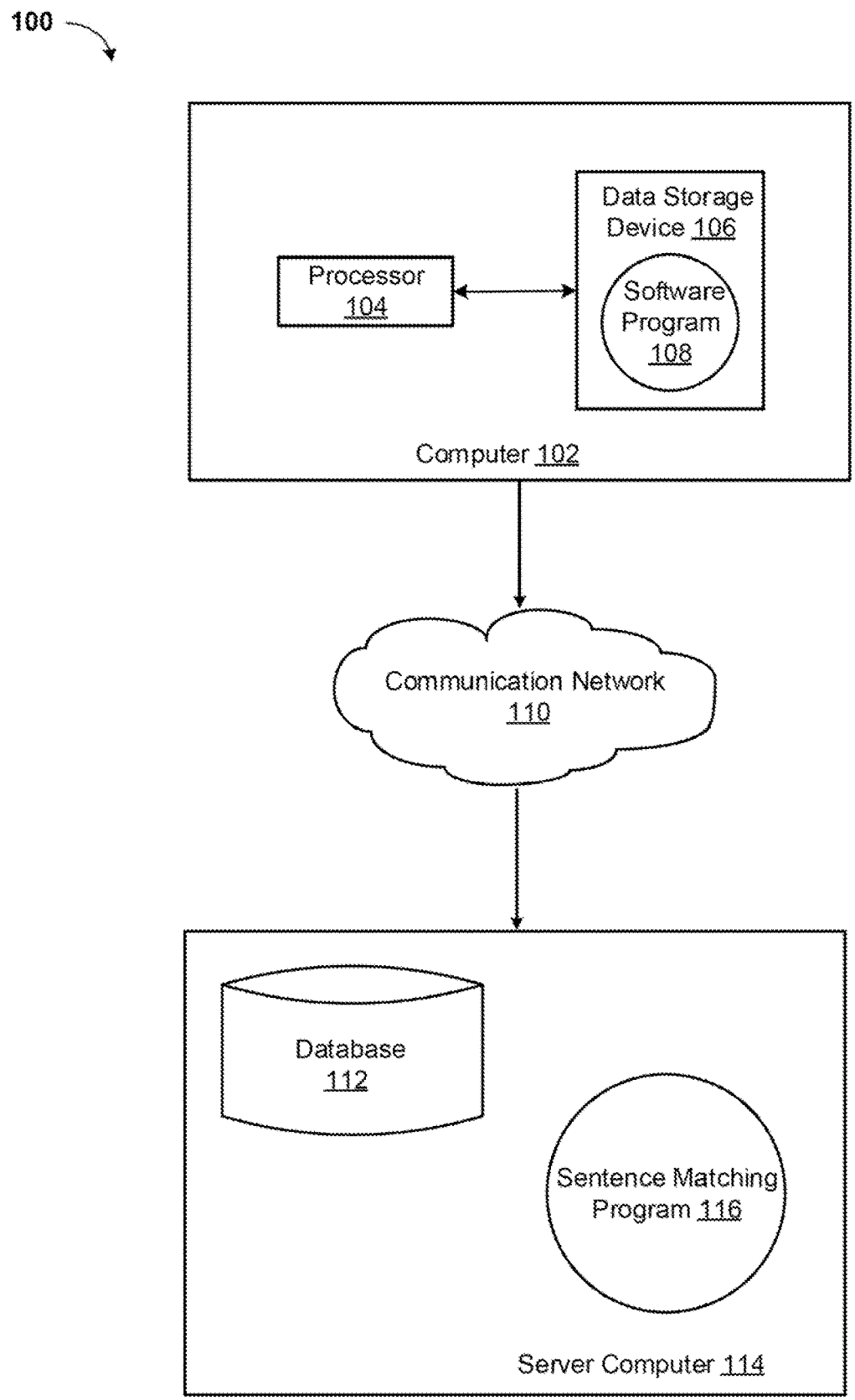
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of data processing, and more particularly to query matching. The following described exemplary embodiments provide a system, method and computer program to, among other things, match pairs of input sentences based on co-attention scores. Therefore, some embodiments have the capacity to improve the field of computing by allowing for model parameters that are relatively small compared to deep learning models such that the number of training examples (labeled data) is not required to be large, and the inference time is significantly smaller.

As previously described, the goal of text-matching tasks is to learn a scoring system that produces a matching score of given the pair of text. This matching task is one of the most important tasks in the natural language processing (NLP) field, which can be applied to various application domains. For an example, in the question answer (QA) system, whether the retrieved question or answer is matched with the user query is an important factor of the system that would affect the user satisfactory performance. The methods for text matching falls in the following two categories. In a rule-based system, the sentence pair are cut into words and the matching score is provided based on the average of the matching scores between a word in one sentence and the most similar word in another sentence. The rule-based methods are fast at producing the matching score in the inference stage and do not require training. In a deep-learning-based system, the deep learning models such as LSTM, BERT, or DSSM, Match Pyramid are currently state-of-the-art models for the sentence pair matching task.

However, due to the diversity of the applications, it is difficult to find a unified model that handles various text matching patterns. For a rule-based system, the performance is very sensitive to the word segmentation and the stop-words, which often results in low performance. For a deep-learning-based system the models require large training data to either fine-tune the model or train from the scratch. Additionally, the inference time is extremely large compared to the rule-based models, which makes it painful for online service in the industry. It may be advantageous, therefore, to use a lightweight system that is suitable for text matching tasks to ease the burden of the large inference time of the deep models and to increase the performance of simple model. Moreover, a multi-layer co-attention mechanism may be used to increase the robustness of the model to various application scenarios by utilizes the co-attention mechanism and pre-trained word embeddings to tackle the aforementioned technical problems and provides a detailed system solution for an efficient text matching.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

Referring now to FIG. 1, a functional block diagram of a networked computer environment illustrating a sentence matching system 100 (hereinafter "system") for sentence pair matching by a neural network. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 4 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 5 and 6. The server computer 114 may also be located in a cloud computing deployment model, such as a private cloud, community cloud, public cloud, or hybrid cloud.

The server computer 114, which may be used for sentence pair matching by a neural network is enabled to run a Sentence Matching Program 116 (hereinafter "program") that may interact with a database 112. The Sentence Matching Program method is explained in more detail below with respect to FIG. 3. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger sentence pair matching program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2:
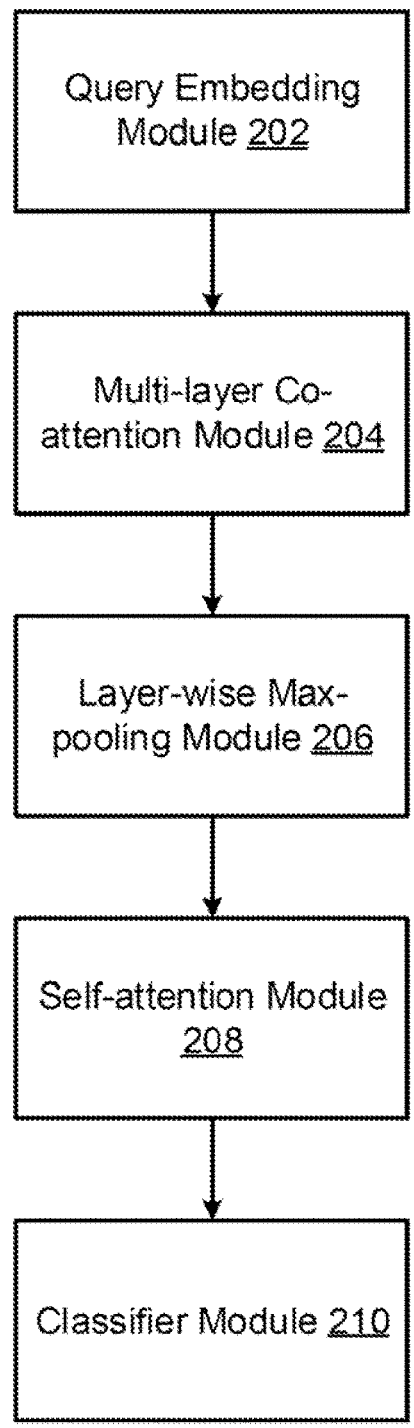
FIG. 2 is a block diagram of a system for query matching, according to at least one embodiment.

Referring now to FIG. 2, a system block diagram of a sentence matching system 200 is depicted. The sentence matching system 200 may include, among other things, a query embedding module 202, a multi-layer co-attention module 204, a layer-wise max-pooling module 206, a self-attention module 208, and a classifier module 210. It may be appreciated that the modules of the sentence matching system 200 may be implemented as standalone modules or as individual layers within a neural network.

The sentence matching system 200 may be a text matching system that may classify a pair of sentences into a label which may describe whether the pair is matched or not matched (label equals to '1' means the pair of sentence is matched, otherwise, if the label is '0' means they are not matched). To capture the deep correlation between the two queries in the pair, the sentence matching system 200 may use a multi-layer co-attention model that may utilize the representation power of word-embeddings and calculate the relevance matrix A for each co-attention layer through different learned weighting strategy through W and V matrices.

The sentence matching system 200 may minimize cross-entropy loss defined as:

$$H_P = -\frac{1}{N}\sum_{i=1}^{N} y_i \log(P(y_i)) + (1 - y_i)\log(1 - P(y_i)),$$

where each $y_i$ may be a ground truth class label that may take the values 0 or 1, and the probability of the label $P(y_i)$ The query embedding module 202 may consider query sentences as word sequences. Each word may be converted into a predefined word vector by a pretrained word embedding model, which may be available online or in a database.

The multi-layer co-attention module 204 may be used to learn the correlation between the word sequence pair through different attention weights, which may be captured by W and V matrices. The matrices W and V may respectively learn different attention weights on the sequence of $Q_1$ and $Q_2$ for each layer. At each layer k, the relevance matrix $A_k$ may capture the correlation between the pair of the weighted sequences. For example, if the weights $w_k$ and $v_k$ at layer k have a high weight on the second position where the word matches, then the relevance matrix would have high score on the second row and second column. Therefore, the co-attention weight matrices W and V may be used to capture the concentration or focus of the matching between the sequence pair. It may be appreciated that some pair matches may be considered to be more important than others. Different layers may capture different match focuses, and the matching similarities may be calculated and measured as in the relevance matrix $A_k$ through a softmax operation.

The layer-wise max-pooling module 206 may convert the relevance matrices of dimension m by n at each layer into a smaller dimension, i.e. 2 by 2 through a sliding-window max operator. The reason for this layer is enhance the robustness (location invariant) of the matching location or position across different pair examples. For instance, if the important words (of the same type in two examples) that are matched in position 1 of $Q_1$ and 3 of $Q_2$ in one example and 3 of $Q_1$ and 2 of $Q_2$ in the other, they should have the same matching pattern.

The self-attention module 208 may allow the sentence matching system 200 to learn different weighting strategies among the co-attention layers. The output of the self-attention module 208 may be treated as the feature vector to the next classifier layer.

The classifier module 210 may include, among other things, a fully-connected activation layer. The feature vector generated from the self-attention module 208 may be fed into a fully-connected and sigmoid activation layer (classifier) to produce a probability $P(y_i)$ that the pair is matched or not. The probabilities may be learned based on minimizing a binary cross entropy loss through the labeled data.

The model training may be performed based on a mini-batch stochastic gradient descent mechanism for learning the network parameters W, V, and U. In the inference stage, the sentence pair are fed into the network and produce a score/probability how likely the pair is matched. Different thresholds may be used for predicting whether they match or not for the strictness criteria in different scenarios or systems. The higher the threshold, the more strict the user defines a match.

According to one or more embodiments, a BERT model may also be used. The queries may be parsed into words based on groups, where each group may represent a category. For example, G1 may include symptom or disease words, G2 may include medical intention words, and G3 may include other words. A matching score F may be calculated by averaging among different group word matching scores. Euclidean distance may be used to measure the coarse similarity between the two sentences using sentence embedding. The two scores may be combined using a function g.

Figure 3:
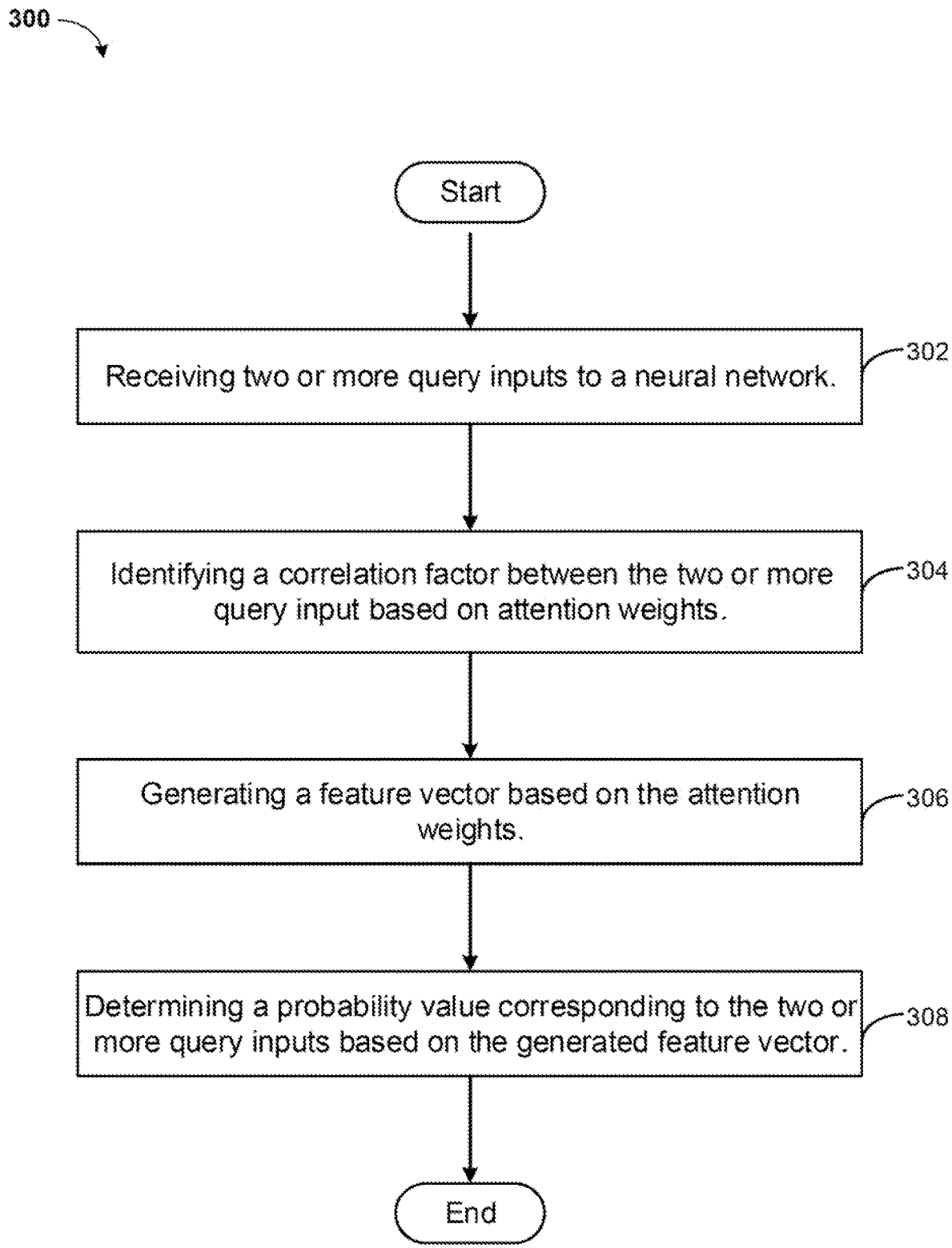
FIG. 3 is an operational flowchart illustrating the steps carried out by a program that matches sentence pairs based on attention weights, according to at least one embodiment.

Referring now to FIG. 3, an operational flowchart illustrating a method 300 carried out by a program that matches queries based on co-attention scores is depicted.

At 302, the method 300 includes receiving two or more query inputs to a neural network.

At 304, the method 300 includes identifying a correlation factor between the two or more query input based on attention weights.

At 306, the method 300 includes generating a feature vector based on the attention weights.

At 308, the method 300 includes determining a probability value corresponding to the two or more query inputs based on the generated feature vector.

It may be appreciated that FIG. 3 provides only an illustration of one implementation and does not imply any limitations with regard to how different embodiments may be implemented. Many modifications to the depicted environments may be made based on design and implementation requirements.

Figure 4:
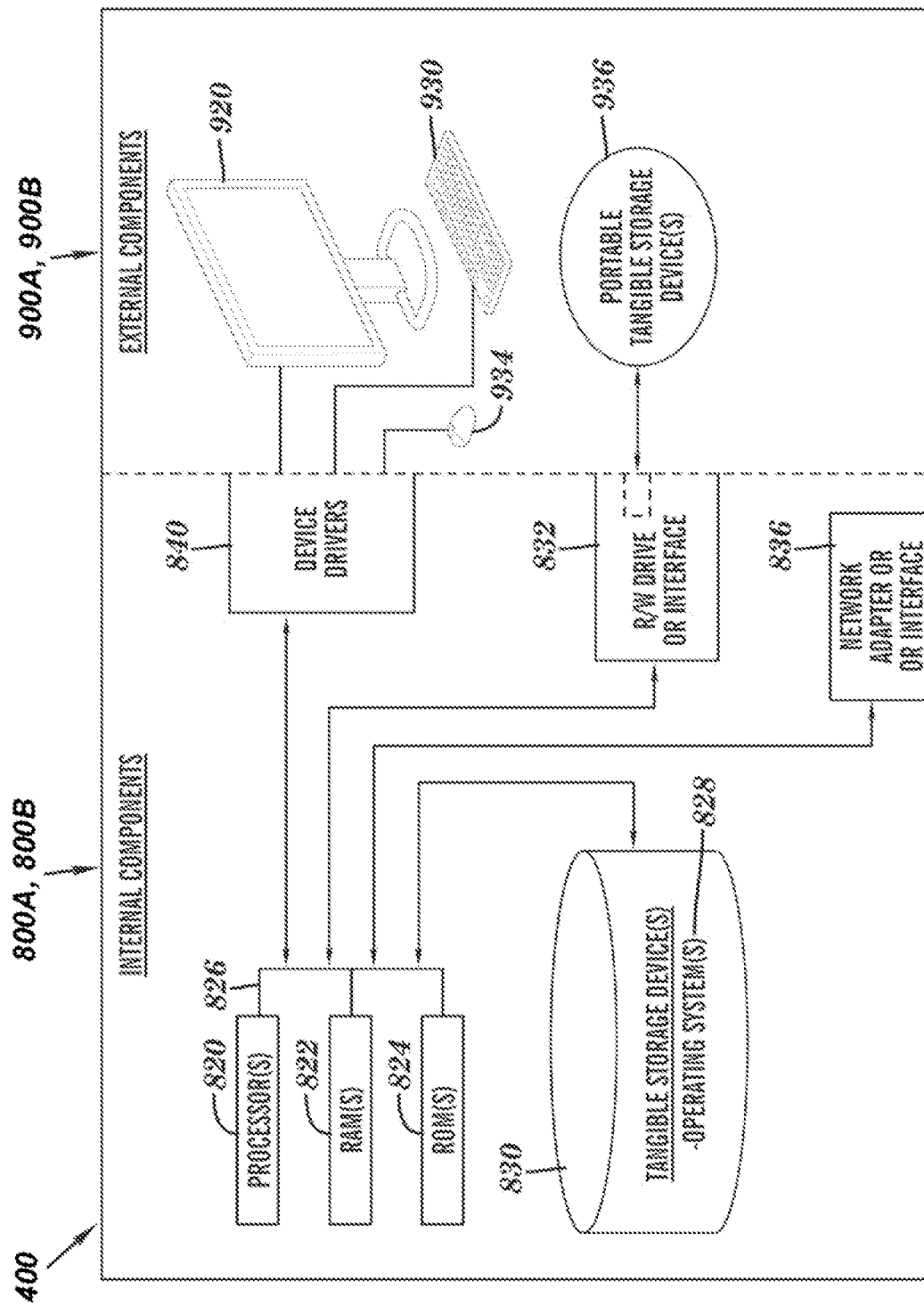
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment. It should be appreciated that FIG. 4 provides only an illustration of one implementation and does not imply any limitations with regard to the environments in which different embodiments may be implemented. Many modifications to the depicted environments may be made based on design and implementation requirements.

Figure 5:
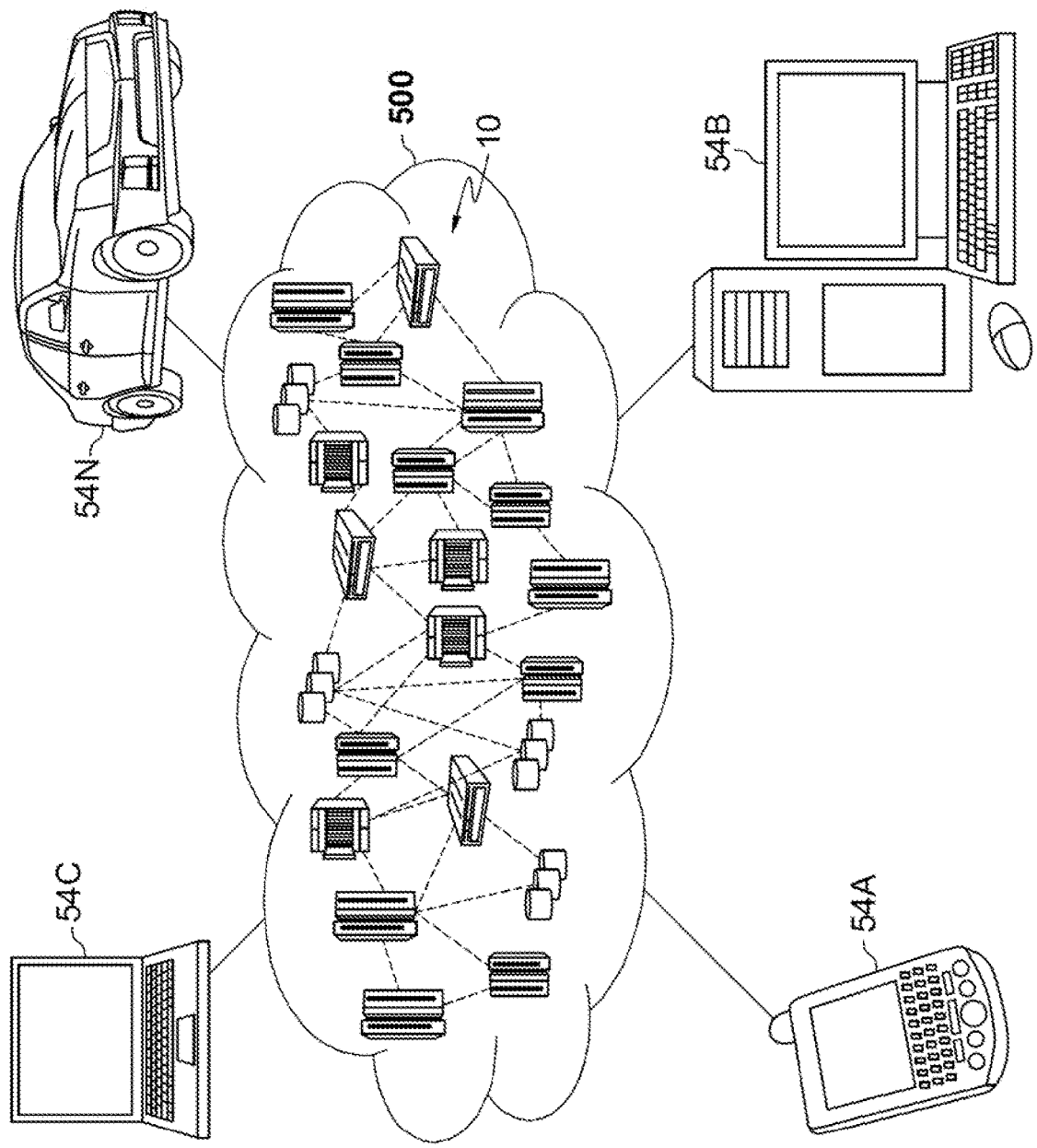
FIG. 5 is a block diagram of an illustrative cloud computing environment including the computer system depicted in FIG. 1, according to at least one embodiment.

Computer 102 (FIG. 1) and server computer 114 (FIG. 1) may include respective sets of internal components 800A,B and external components 900A,B illustrated in FIG. 5. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Sentence Matching Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Sentence Matching Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Sentence Matching Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Sentence Matching Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring to FIG. 5, illustrative cloud computing environment 500 is depicted. As shown, cloud computing environment 500 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 500 can communicate with any type of computerized device over any type of network and/or network addressable connection (e.g., using a web browser).

Figure 6:
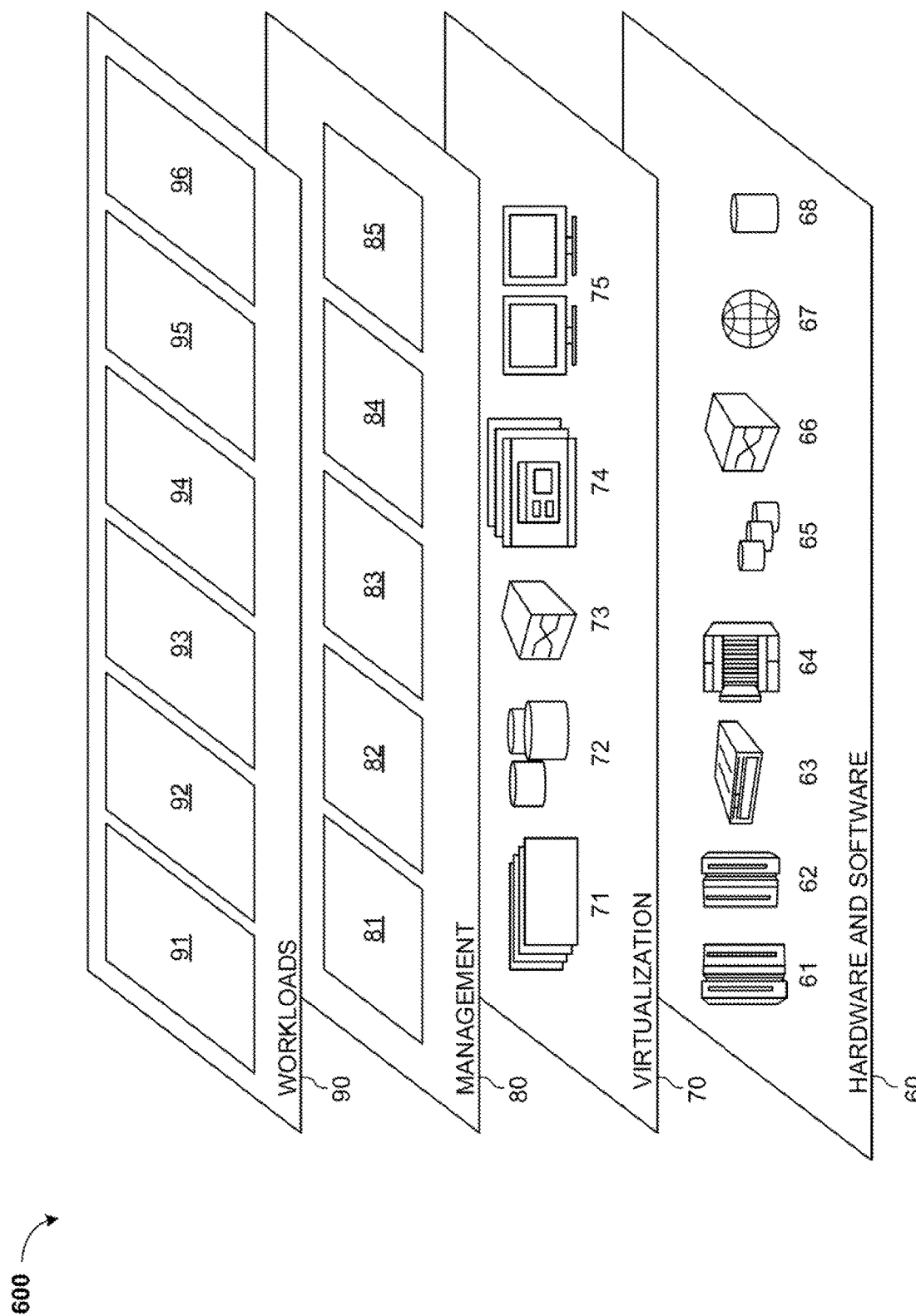
FIG. 6 is a block diagram of functional layers of the illustrative cloud computing environment of FIG. 5, according to at least one embodiment.

Referring to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Sentence Matching 96. Sentence Matching 96 may match sentence pairs based on attention weights.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of query matching, executable by a processor, comprising:
   receiving two or more query inputs to a neural network;
   identifying a correlation factor between the two or more query inputs based on a multi-layer co-attention module including attention weights that are generated based on a correlation between pairs of the two or more query inputs, wherein the multi-layer co-attention module includes a plurality of layers in which each layer includes a different weighting strategy, wherein the correlation is calculated based on co-attention weight matrices capturing a concentration or focus between the pairs of the two or more query inputs, wherein each layer of the multi-layer co-attention module includes different attention weights for the co-attention weight matrices such that the co-attention weight matrices correspond to a different concentration or focus at each layer of the multi-layer co-attention module, wherein a relevance matrix is generated for each layer of the multi-layer co-attention module based on the co-attention weight matrices;
   generating a feature vector based on the attention weights and the relevance matrix of each layer of the multi-layer co-attention module; and
   determining, based on the generated feature vector, a probability value corresponding to a likelihood the two or more query inputs are matched.

2. The method of claim 1, further comprising determining a pairing between two of the two or more query inputs based on the determined probability value.

3. The method of claim 1, wherein a pair of query inputs is selected based on a loss value corresponding to the probability value being minimized.

4. The method of claim 1, wherein the attention weights are calculated as average values based on the different weighting strategies included in the plurality of layers of the multi-layer co-attention module.

5. A computer system for query matching, the computer system comprising:
   one or more computer-readable non-transitory storage media configured to store computer program code; and
   one or more computer processors configured to access said computer program code and operate as instructed by said computer program code, said computer program code including:
      receiving code configured to cause the one or more computer processors to receive two or more query inputs to a neural network;
      identifying code configured to cause the one or more computer processors to identify a correlation factor between the two or more query inputs based on a multi-layer co-attention module including attention weights, that are generated based on a correlation between pairs of the two or more query inputs, wherein the multi-layer co-attention module includes a plurality of layers in which each layer includes a different weighting strategy, wherein the correlation is calculated based on co-attention weight matrices capturing a concentration or focus between the pairs of the two or more query inputs, wherein each layer of the multi-layer co-attention module includes different attention weights for the co-attention weight matrices such that the co-attention weight matrices correspond to a different concentration or focus at each layer of the multi-layer co-attention module, wherein a relevance matrix is generated for each layer of the multi-layer co-attention module based on the co-attention weight matrices;
      generating code configured to cause the one or more computer processors to generate a feature vector based on the attention weights and the relevance matrix of each layer of the multi-layer co-attention module; and
      first determining code configured to cause the one or more computer processors to determine, based on the generated feature vector, a probability value corresponding to a likelihood the two or more query inputs are matched.

6. The computer system of claim 5, further comprising second determining code configured to cause the one or more computer processors to determine a pairing between two of the two or more query inputs based on the determined probability value.

7. The computer system of claim 5, wherein a pair of query inputs is selected based on a loss value corresponding to the probability value being minimized.

8. The computer system of claim 5, wherein the attention weights are calculated as average values based on the different weighting strategies included in the plurality of layers of the multi-layer co-attention module.

9. A non-transitory computer readable medium having stored thereon a computer program for query matching, the computer program configured to cause one or more computer processors to:
   receive two or more query inputs to a neural network;
   identifying a correlation factor between the two or more query inputs based on a multi-layer co-attention module including attention weights that are generated based on a correlation between pairs of the two or more query inputs, wherein the multi-layer co-attention module includes a plurality of layers in which each layer includes a different weighting strategy, wherein the correlation is calculated based on co-attention weight matrices capturing a concentration or focus between the pairs of the two or more query inputs, wherein each layer of the multi-layer co-attention module includes different attention weights for the co-attention weight matrices such that the co-attention weight matrices correspond to a different concentration or focus at each layer of the multi-layer co-attention module, wherein a relevance matrix is generated for each layer of the multi-layer co-attention module based on the co-attention weight matrices;
   generating a feature vector based on the attention weights and the relevance matrix of each layer of the multi-layer co-attention module; and
   determining, based on the generated feature vector, a probability value corresponding to a likelihood the two or more query inputs are matched.

10. The computer readable medium of claim 9, further comprising determining code configured to cause the one or more computer processors to determine a pairing between two of the two or more query inputs based on the determined probability value.

11. The computer readable medium of claim 9, wherein a pair of query inputs is selected based on a loss value corresponding to the probability value being minimized.

\* \* \* \* \*